United States Patent [19]

Mizusawa

[11] 4,261,623
[45] Apr. 14, 1981

[54] VEHICLE BRAKE OIL-PRESSURE CONTROL VALVE DEVICE

[75] Inventor: Mitutoyo Mizusawa, Ueda, Japan

[73] Assignee: Nissin Kogyo Kabushiki Kaisha, Ueda, Japan

[21] Appl. No.: 128,117

[22] Filed: Mar. 7, 1980

[30] Foreign Application Priority Data

Mar. 12, 1979 [JP] Japan .................................. 54/28371

[51] Int. Cl.³ ............................................. B60T 13/06
[52] U.S. Cl. ................................ 303/6 C; 303/24 A; 303/24 F
[58] Field of Search ................ 303/24 A, 24 F, 24 C, 303/6 C, 84 A, 84 R; 188/349

[56] References Cited

U.S. PATENT DOCUMENTS 3,455,609  7/1969  Bratten ............................. 303/24 C
3,922,020  11/1975  Koike et al. ................... 303/24 C X

*Primary Examiner*—Douglas C. Butler
*Attorney, Agent, or Firm*—Haseltine and Lake

[57] ABSTRACT

A brake oil-pressure control valve device for vehicles in which operating oil pressure of rear wheel brakes is automatically controlled in accordance with the braking force as required. The device comprises first and second branch oil passages branched from an oil passage connected to a rear wheel brake output port of a master cylinder, a reducing valve interposed between the first branch oil passage and the rear wheel brakes, springs for determining pressure to start reducing action of the reducing valve, a control piston disposed in an oil pressure chamber communicated with the second branch oil passage to normally hold the reducing valve in its open position, and a weight valve disposed within the valve chamber to sense deceleration of the vehicle.

2 Claims, 2 Drawing Figures

VEHICLE BRAKE OIL-PRESSURE CONTROL VALVE DEVICE

BACKGROUND OF THE INVENTION

1. Field of the Invention

The present invention relates to a brake oil-pressure control valve device, in vehicles particularly four wheel automobiles where hydraulic circuits for front and rear wheel brakes are formed into two systems independently of each other, wherein the operating oil pressure of the rear wheel brake is automatically controlled in accordance with the braking force as required.

2. Description of the Prior Art

In the past, the control valve devices of this kind include one device wherein in an oil passage for connecting an output port of a master cylinder to the rear wheel brake there is provided a reducing valve capable of proportionally reducing output oil pressure of the master cylinder to transmit the pressure to the rear wheel brake, and the other wherein in the oil passage there is provided a weight valve which cuts off the oil passage as it senses a reduced speed more than a preset value of the vehicle. However, in the case of the former, since a folding point in the braking force distribution curve is constant, the device is not suitable for use in vehicles such as trucks which vary in vehicle weight depending on the loaded or unloaded condition and extremely vary in load distribution of the front and rear wheels. Also in the case of the latter, there is a problem that the device may not sufficiently respond to the change in load weight.

SUMMARY OF THE INVENTION

The present invention has been proposed in view of those problems noted above with respect to prior arts, and an object of the invention to provide the device as described wherein the reducing valve and weight valve are combined, the folding point by the reducing valve is displaced in response to the change in load weight of the vehicle and such displacement may be held by the weight valve to properly distribute the braking force to the front and rear wheels of the vehicle in accordance with the load weight thereof.

Other objects and features of the invention will be pointed out in the following description and claims and illustrated in the accompanying drawings.

DESCRIPTION OF THE PREFERRED EMBODIMENT

Figure 1:
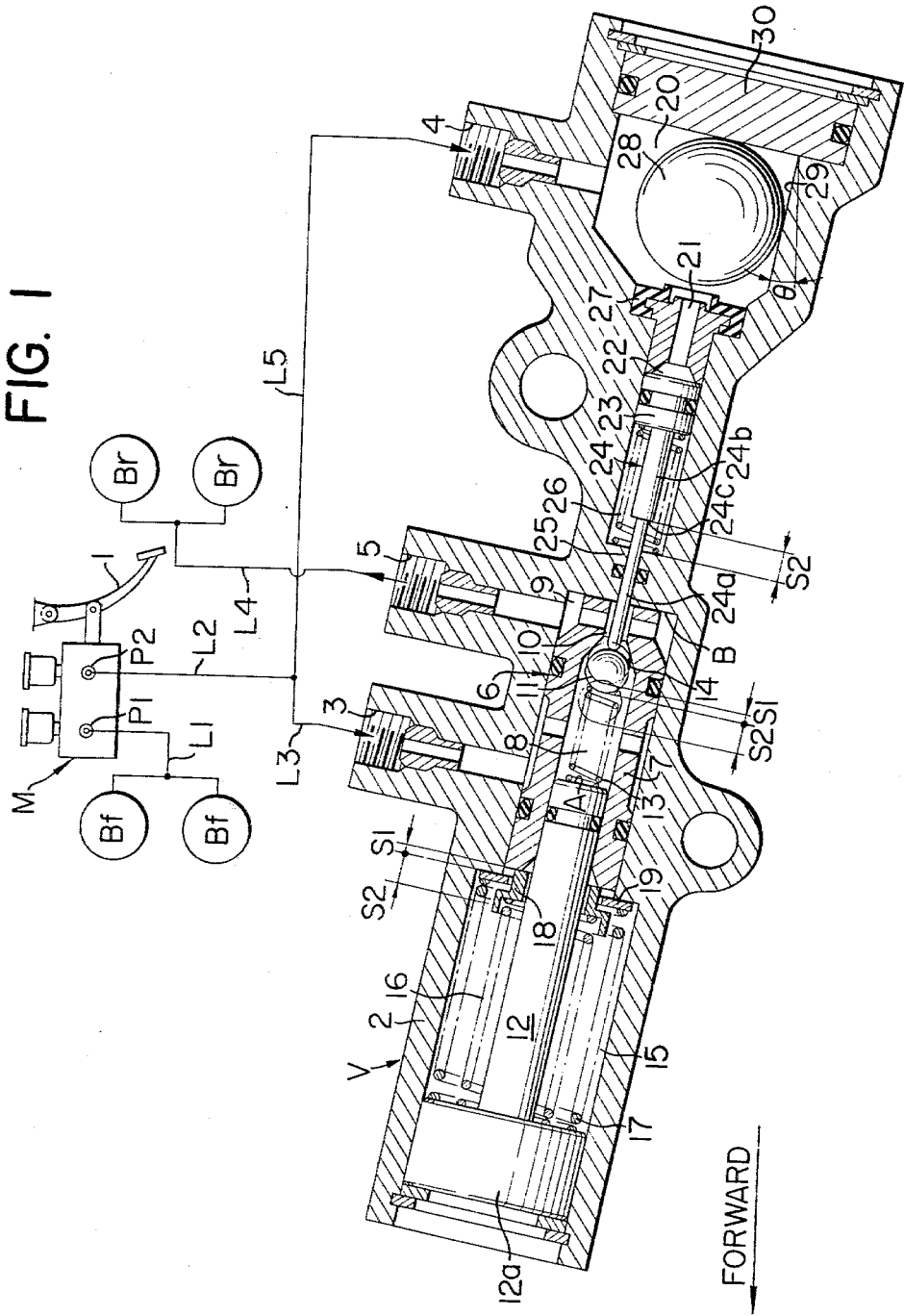
FIG. 1 is a longitudinal sectional side view of one embodiment in accordance with the present invention.

Referring now to FIG. 1, reference character M designates a well-known tandem type master cylinder operated by a brake pedal 1, Bf right and left front wheel brakes and Br right and left rear wheel brakes. A first output port P1 is connected to the right and left front wheel brakes Bf through an oil passage L1, and a second output port P2 thereof is connected to the rear wheel brakes Br through an oil passage L2, a first branch oil passage L3 branched therefrom, a control valve device V of the present invention and an oil passage L4.

Open to the outside of the control valve device V are a first inlet 3 in communication with the first branch oil passage L3, a second inlet 4 in communication with a second branch oil passage L5, and an outlet 5 in communication with a rear wheel brake oil passage L4, the valve box 2 accommodating therein a reducing valve 6 which controls the communication between the first inlet 3 and the outlet 5.

The reducing valve 6 comprises a pressure receiving piston 7 slidably receive within the valve box 2, an input oil pressure chamber 8 formed on one side of the piston and in communication with the first inlet 3, an output oil pressure chamber 9 formed on the other side of the piston 7 and in communication with the outlet 5, and a spherical valve member 11 disposed within the input oil pressure chamber 8 and adapted to open and close a communication oil passage 10 between both chambers 8 and 9. Reference numeral 14 designates a valve seat in cooperation with the valve member 11. A guide shaft member 12 for the pressure receiving piston 7 is fitted in the valve box 2 from one side thereof, the member 12 also serving as a valve cover, and the guide shaft member 12 has its foremost end inserted oil-tight into the pressure receiving piston 7 to form a fixed wall of the input oil pressure chamber 8. A valve spring 13 for biasing the valve member 11 in a closing direction is interposed between the end of the member 12 and the valve member 11. A pressure receiving surface A of the input oil pressure chamber 8 of the pressure receiving piston 7 is narrower in area than a pressure receiving surface B of the output oil pressure chamber 9 (that is, $A<B$).

Also, the valve box 2 is provided at a front portion (to the left as viewed in the drawing) with a spring chamber 15 which extends through the guide shaft member 12, the spring chamber 15 housing therein an inner first coiled spring 16 retained between a cover portion 12a of the guide shaft member 12 and the pressure receiving piston 7 to determine pressure to start reducing action of the reducing valve 6 when unloaded and an outer second coiled spring 17 in cooperation with the first coiled spring 16 to determined pressure to start reducing action therefor when loaded. One end of the first coiled spring 16 normally abuts on the end of the pressure receiving piston 7 through a seat plate 18, one end of the second coiled spring 17 abuts on the inner surface of the valve box 2 through the seat plate 19, and the seat plate 19 is forced forward from the pressure receiving piston 7 when the latter slides forward (to the left as view in the drawing) more than distance S1.

The valve box 2 is further provided at the rear with a valve chamber 20 in communication with the second inlet 4 and an oil pressure chamber 22 in communication with the front portion of the valve chamber 20 through an oil passage 21, the oil pressure chamber 22 slidably receiving a control piston 23. A long shaft portion 24 comprising a small diameter portion 24a and a large diameter portion 24b extends from the front end of the piston 23, and the foremost end of the small diameter portion 24a extends through a partitioning wall 25 of the valve box 2 and the oil passage 10 of the pressure receiving piston 7 into abutment against the valve member 11. Normally, the control piston 23 moves the valve member 11 through the distance S1 from the valve seat 14 to open the oil passage 10. Distance S2 from a stepped portion 24c of the shaft portion 24 to the partitioning wall 25 is the range of operating stroke of the control piston 23. A coiled spring 26 for determining oil pressure to start operation of the piston 23 is interposed between the partitioning wall 25 and the control piston 23. A spherical weight valve 28 is received within the valve chamber 20, which valve cooperates with a resilient valve seat 27 disposed in the inlet of the oil passage 21. The bottom surface of the valve chamber 20 is formed into a bevel face 29 inclined by a given angle $\theta$ frontwardly upwardly of the vehicle by mounting the valve box 2 obliquely on the vehicle body, and accordingly the weight valve 28 is normally supported on the valve cover 30 downwardly of the bevel face 29 and away from the valve seat 27, but when a reducing speed more than a predetermined value of the vehicle is sensed, the valve is seated on the valve seat 27 to cut off the oil passage 21.

Next, the operation of the above-mentioned embodiment will be described.

When the driver steps on the brake pedal 1, during the running of the vehicle, to operate the master cylinder M and oil pressures are put out from the first and second ports P1 and P2, then the output oil pressure of the first output port P1 is transmitted to the right and left front wheel brakes Bf through the oil passage L1 to actuate these brakes. On the other hand, the output oil pressure of the second output port P2 is transmitted to the right and left rear wheel brakes Br through the oil passage L2, the first branch oil passage L3, the reducing valve 6, and the oil passage L4 to actuate these brakes.

When the output oil pressure of the second output port P2 of the master cylinder M increases to a level above the predetermined value, the reducing valve 6 begins to control the operating oil pressure of the rear wheel brakes Br.

The above-mentioned operating oil pressure control action differs depending upon the conditions where the vehicle is unloaded and where the vehicle is loaded, and the description therefor will be given separately with reference to FIG. 2.

Figure 2:
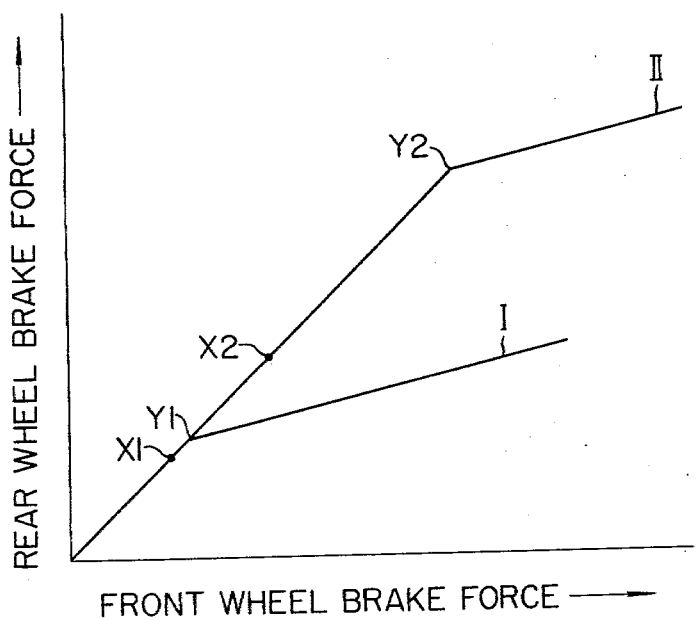
FIG. 2 is a graphic representation showing the distribution of the braking force to the front and rear wheels.

(a) Operating oil pressure control when unloaded (See FIG. 2 (I))

When unloaded, the first coiled spring 16 determines the pressure to start reducing action of the reducing valve 6. Further, when unloaded, the required braking force is small and a predetermined deceleration occurs in the vehicle when the output oil pressure of the master cylinder M is relatively low, and thus the weight valve 28 senses this to engage the valve 27 to cut off the oil passage 21 in communication with the oil pressure chamber 22 (FIG. 2, X1). Oil pressure from the second branch oil passage L5 so far exerts on the pressure receiving surface of the control piston 23 facing to the oil pressure chamber 22 through the valve chamber 20 and oil passage 21 but the oil pressure is so low as not to produce the biasing force enough to overcome the coiled spring 26, and as a consequence, the control piston 23 is not operated and hence, the valve member 11 is held in open position as indicated by the solid line of FIG. 1.

In this condition, when oil pressure of the input oil pressure chamber 8 reaches a predetermined value due to the increase in output oil pressure of the second output port P2 of the master cylinder M, the biasing force by frontward (leftward in the drawing) oil pressure acting on the pressure receiving piston 7 caused by the difference in area between both pressure receiving surfaces A and B of the input and output oil pressure chambers 8 and 9 overcomes the set load of the first coiled spring 16 to slidably move the pressure receiving piston 7 frontwardly (leftwards in the drawing) by the distance S1 causing the valve seat 14 to engage the valve member 11 to close the oil passage 10 between the input and output oil pressure chamber 8 and 9 (FIG. 2, Y1). Thereafter, if the output oil pressure of the second output port P2 further increases, the oil pressure of the input oil pressure chamber 8 also increases. Thus, the pressure receiving piston 7 is forced back rearwardly (rightwards in the drawing) by the aforesaid oil pressure to move the valve seat 14 away from the valve member 11 to open the oil passage 10 so as to increase pressure in the output oil pressure chamber 9. However, as the pressure increases as described, the forward biasing force due to oil pressure caused by the difference in area between both pressure receiving surfaces A and B of the pressure receiving piston 7 immediately increases to advance the pressure receiving piston 7 again causing the valve seat 14 to engage the valve member 11. Thereafter, as the output of the second output port P2 increases, similar cycle of operation is repeated. As a result, after the pressure receiving piston 7 has been once operated, the oil pressure of the input oil pressure chamber 8 can be proportionally reduced and transmitted to the output oil pressure chamber 9 and thus to the rear wheel brakes Br.

(b) Operating oil pressure control when loaded (See FIG. 2 (II))

When loaded, the first and second coiled springs 16, 17 cooperate to determined pressure to start reducing operation of the reducing valve 6, as previously mentioned.

When loaded, the required braking force is large in accordance with the load weight and a predetermined deceleration occurs in the vehicle when the output oil pressure of the master cylinder is relatively high.

Accordingly, by the time the weight valve 28 operates, the relatively high output oil pressure of the second output port P2 of the master cylinder M exerts on the input oil pressure chamber 8 of the reducing valve 6 and at the same time also exerts on the oil pressure chamber 22 through the first branch oil passage L5, the valve chamber 20 and the oil passage 21, whereby the aforesaid oil pressure causes the control piston 23 to be forced forward against the set load of the coil spring 26 and the valve member 11 of the reducing valve 6 is moved forward by the end of the shaft portion 24 to delay the closing timing of the valve member 11.

The moving distance of the valve member 11 depends on the load weight of the vehicle but the maximum moving distance is limited to the maximum operating stroke S2 of the control piston 23 controlled by the shaft portion 24.

When the valve member 11 is moved, by the control piston 23, a certain distance within the range of the operating stroke S2, deceleration of the vehicle at that time is sensed by the weight valve 28 and the valve engages the valve seat 27 to cut off the oil passage 21 so that the control piston 23 does not move any longer and the valve member 11 is held at its already moved position.

Assume for convenience's sake that the control piston 23 has moved through the maximum operating stroke S2, the valve member 11 is in position the distance S1+S2 away from the valve seat 14 to open the oil passage 10 (FIG. 2, X2).

In this condition, the output oil pressure of the second output port P2 of the master cylinder M is transmitted to the rear wheel brakes Br through the oil passage 10, and the braking force thereof increases in the relation of 1:1 with respect to the braking force acting on the front wheel brakes Bf. On the other hand, the forward biasing force due to the oil pressure caused by the difference in area between the pressure receiving surfaces A and B of the input and output oil pressure chambers 8 and 9 exerts on the pressure receiving piston 7 to slidably move the pressure receiving piston 7 by the distance S1 against the set load of the first coil spring 16 causing the end thereof to abut on the seat plate 19 of the second coiled spring 17. In this condition, since the valve member 11 is not yet positioned to close the oil passage 10, the braking force acting on the rear wheel brakes Br continues to increase similarly as described above.

When the output oil pressure of the second output port P2 further increases and the oil pressure of the input oil pressure chamber 8 reaches a predetermined value, the forward biasing force due to the oil pressure acting on the pressure receiving piston 7 overcomes the set loads of the first and second coiled springs 16 and 17 to slidably move the pressure receiving piston 7 forwardly by the distance S2, as described above, and at this time, finally the valve seat 14 is brought into engagement with the valve member 11 to close the oil passage 10 between the input and output oil pressure chambers 8 and 9 (FIG. 2, Y2). Then, the operation similar to that of the previously mentioned operation (a) is repeated so that the oil pressure of the input oil pressure chamber 8 is proportionally reduced and transmitted to the rear wheel brakes Br and thus the pressure to start reducing operation of the reducing valve 6 may be automatically adjusted at its maximum.

As described above, in accordance with the present invention, since the closing timing of the reducing valve for reducing the output oil pressure of the master cylinder to transmit it to the rear wheel brakes can be delayed in accordance with the increase in load weight of the vehicle, the pressure to start reducing action of the reducing valve may be automatically increased and adjusted in response to the increase in load weight to distribute the braking force at the adequate rate to the front and rear wheel brakes in correspondence to the load condition of the vehicle, thus providing the effective braking action at all times. In addition, a small diameter of the control piston for controlling the reducing valve will suffice in view of its nature and hence the quantity of consumption of the operating oil of the control piston is minimal so that the operating amount of the master cylinder, that is, the step-in amount of the brake pedal is almost the same as that of conventional control means.

Further, since the springs for determining the pressure to start reducing action of the reducing valve comprise a normal operated first spring and a second spring cooperating with the first spring when the closing timing of the reducing valve is delayed beyond the preset value, the pressure to start reducing action of the reducing valve may be considerably increased when the vehicle is loaded to provide a powerful braking action corresponding to the aforesaid load condition.

What is claimed is:

1. A vehicle brake oil pressure control device comprising first and second branch oil passages branched from an oil passage connected to a rear wheel brake output port of a master cylinder; a reducing valve interposed between said first branch oil passage and rear wheel brakes, said reducing valve being capable of reducing and transmitting output oil pressure of said master cylinder to the rear wheel brakes; springs for determining pressure to start reducing action of said reducing valve; a control piston disposed in an oil pressure chamber being in communication with said second branch oil passage through a valve chamber and a communicating oil passage, said piston normally holding said reducing valve in its open state and operating to delay closing time of said reducing valve in response to an increase of oil pressure above a predetermined value introduced into said oil pressure chamber; and a weight valve disposed within said valve chamber to sense deceleration above a predetermined value of a vehicle to thereby cut off said communicating passage; said reducing valve is further comprised of a pressure receiving piston slidably housed in a valve box, an input oil pressure chamber formed on one side of said pressure receiving piston in communication with said first branch oil passage, an output oil pressure chamber formed on the other side of said pressure receiving piston and in communcation with said input oil pressure chamber and rear wheel brakes, said output oil pressure chamber having a larger pressure receiving area than that of said input oil pressure chamber, a valve member capable of opening and closing a communicating passage between said input and output oil pressure chambers being adapted to be biased by the spring force in a valve-closing direction, said valve member in cooperation with said control piston being normally held in its open state and being operable to be delayed in closing timing in response to an increase above a predetermined value of output oil pressure of said master cylinder exerted upon said control piston, said pressure receiving piston being biased in an opening direction of said valve member; and said pressure receiving piston and said springs cooperate with one another permitting a set load of said springs to be increased as said pressure receiving piston slidably moves to a valve closing position.

2. The vehicle brake oil pressure control device according to claim 1, wherein said springs comprise a first spring for normally biasing said reducing valve in an opening direction and a second spring for biasing said reducing valve in an opening direction along with said first spring when the closing timing of said reducing valve is delayed beyond the preset value.

* * * * *